June 19, 1923.
C. H. ALEXANDER
1,459,131
DEVICE FOR PULLING BEARING CUPS, SLEEVES, AND THE LIKE
Filed Jan. 21, 1922  2 Sheets-Sheet 1
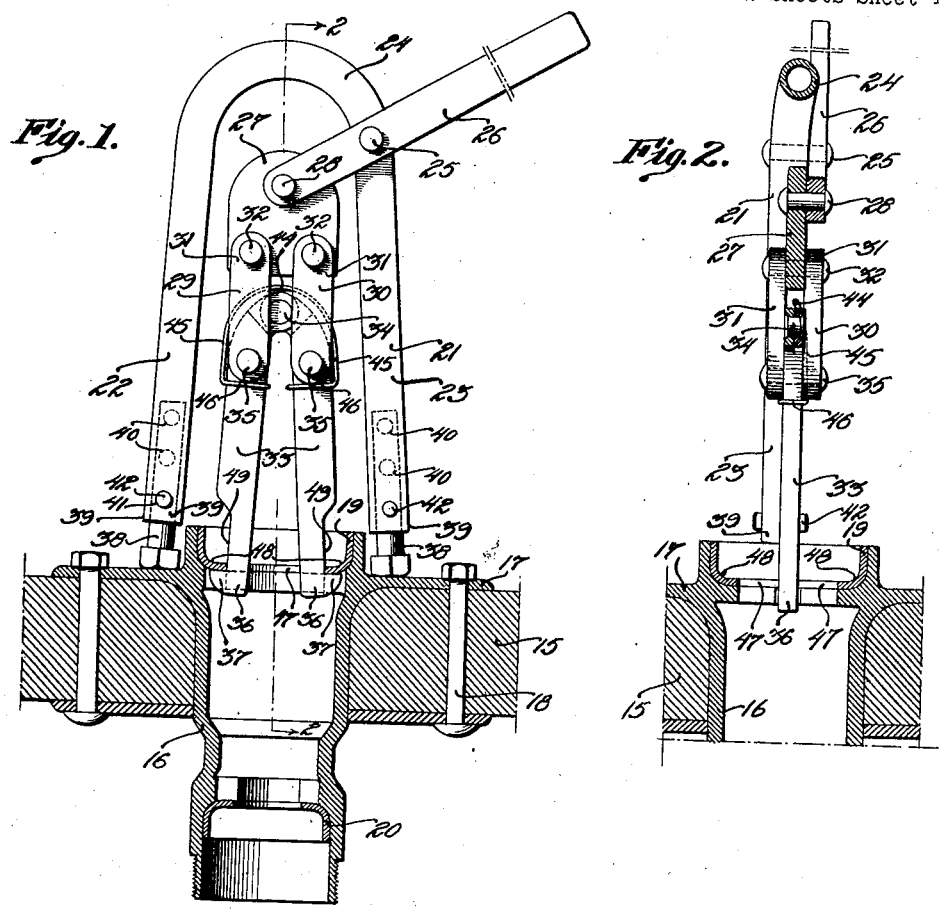
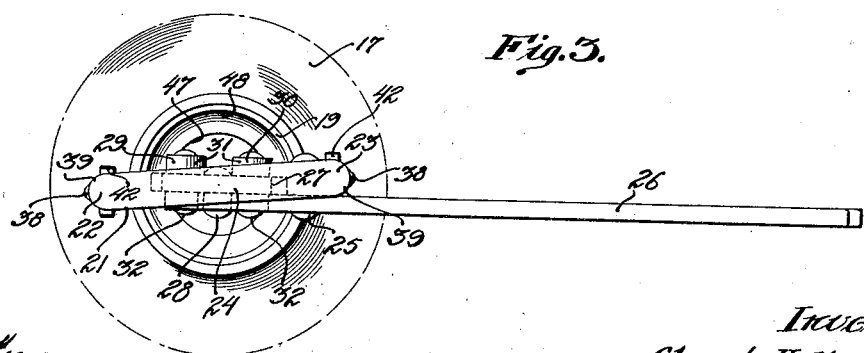
Witnesses
George A. Gruas
Augustus B. Coppes
Inventor
Claude H. Alexander
By Joshua R. H. Potts
his Attorney June 19, 1923.
C. H. ALEXANDER
1,459,131
DEVICE FOR PULLING BEARING CUPS, SLEEVES, AND THE LIKE
Filed Jan. 21, 1922　　　　2 Sheets-Sheet 2
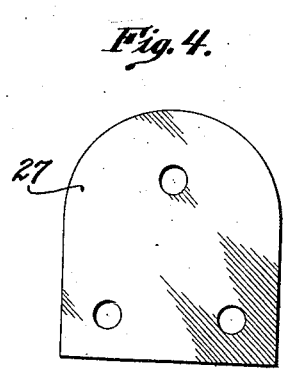
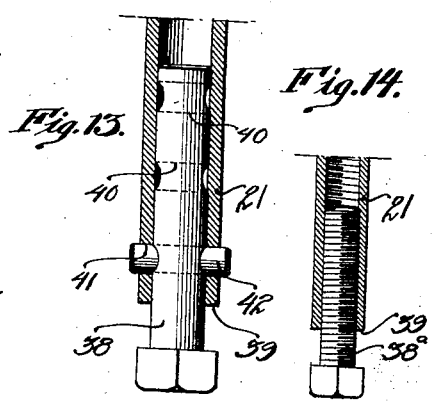
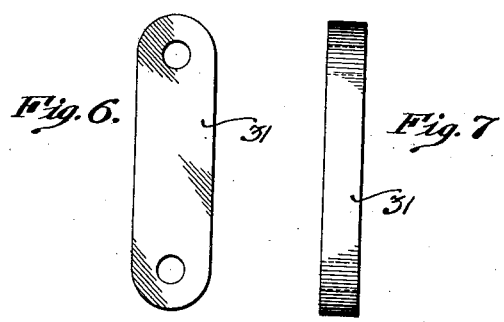
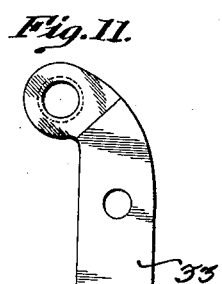
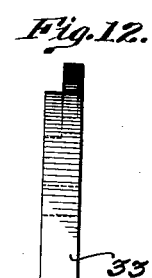
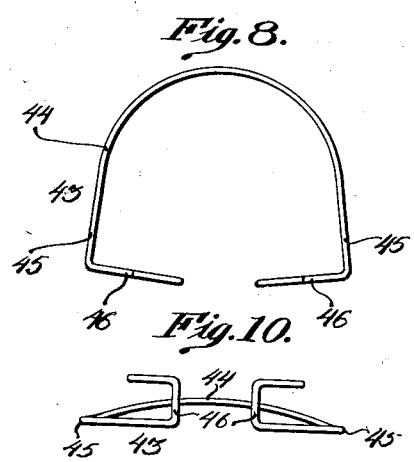
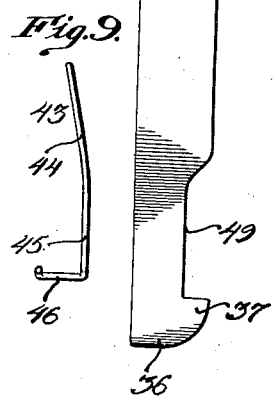
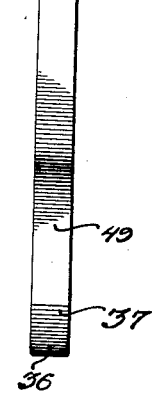

Patented June 19, 1923.

1,459,131

UNITED STATES PATENT OFFICE.

CLAUDE H. ALEXANDER, OF OXFORD, PENNSYLVANIA.

DEVICE FOR PULLING BEARING CUPS, SLEEVES, AND THE LIKE.

Application filed January 21, 1922. Serial No. 530,789.

*To all whom it may concern:*

Be it known that I, CLAUDE H. ALEXANDER, a citizen of the United States, residing at Oxford, in the county of Chester and State of Pennsylvania, have invented certain new and useful Improvements in Devices for Pulling Bearing Cups, Sleeves, and the like, of which the following is a specification.

One object of my invention is to provide an improved device which can be used with advantage for quickly and easily removing ball bearing cups and sleeves or the like from automobile wheel hubs.

Another object is to make my improved device of such construction that it will be of a strong and durable construction and capable of being readily manipulated.

These objects, and other advantageous ends which will be described hereinafter, I attain in the following manner, reference being had to the accompanying drawings in which—

Figure 1 is an elevational view showing my improved pulling device in a position in which it can be applied to remove a ball bearing cup from the hub of a wheel; a portion of the wheel, the hub and ball bearing cup being illustrated in section, Figure 2 is a section taken on the line 2—2 of Figure 1, Figure 3 is a top plan view of the device in the position illustrated in Figure 1, Figures 4 and 5 are face and edge views of a lever connecting head which forms a part of my invention, Figures 6 and 7 are face and edge views of one of a number of connecting links which I preferably employ, Figures 8, 9 and 10 are front, side and inverted plan views respectively of a spring which I preferably employ, Figures 11 and 12 are face and edge views of one of a number of hooked members which I preferably employ, Figure 13 is an enlarged fragmentary view partly in section showing certain features of my invention, and Figure 14 is a view of the same general character as that shown in Figure 13 illustrating a slightly modified form of the parts.

Referring to the drawings, 15 represents a portion of a vehicle wheel, such for example as an automobile wheel which has a hub 16; said hub providing a flange 17 which is secured to the portion 15 of the wheel by bolts 18 in a well known manner. The hub 16 has ball bearing cups 19 and 20 and for purpose of illustration of the utility of my improved pulling device, it will be considered that it is intended to remove the ball bearing cup 19 from the hub, which operation is usually difficult since the cup is forced within the hub and comparatively great power is required to withdraw the same. Furthermore this difficulty is increased due to the fact that there are no portions of the cup protruding beyond the end of the hub in order to secure a firm grip by any ordinary tool. In addition to this, when wear occurs on these cups, the same causes the spreading of the metal so that the cup, after the wheel has been used, is practically wedged or expanded slightly in the portions of the hub; thereby locking the cup against easy removal.

The device of my invention includes a yoked or U-shape member 21 which constitutes the body portion of the device and this yoked member can be made from a length of metallic pipe which is bent in the form illustrated in Figure 1 to provide two leg portions 22 and 23 which are spaced apart. The member 21 adjacent the curved end 24 and to one side of a central plane passing between the legs is provided with a pivot pin 25 upon which is pivotally mounted an operating lever 26.

A head 27, which is preferably made of a block of metal of the shape illustrated in Figures 4 and 5, is pivotally connected to the lever by a pivot pin 28 which is spaced from the pivot 25 so that the head 27 occupies a position between the legs 22 and 23. Two pairs 29 and 30 of links 31 are pivotally connected to the head 27 by pivot pins 32; said pivot pins being spaced apart as shown in Figure 1 and the links of each pair are positioned adjacent the opposite faces of the head 27 as shown in Figure 2. Thus the links 31 of each pair are spaced apart. Two hooked pulling members 33 are pivotally connected together at 34 and are respectively pivoted to the lower portions of the links 31 by pivot pins 35 in a manner so that one of the hooked pulling members is located within the space between the links of the pair 29 while the other of the hooked members is located within the space between the links of the pair 30.

The lower ends of the hooked pulling members are provided with hooks 36 which extend in opposite directions and provide shoulders 37.

Adjustable terminal members 38, which in Figures 1 and 13, are shown in the form of rods, are adapted to extend into the hollow lower ends 39 of the yoked member 21 and these rods have a number of holes 40 which are spaced apart in the direction of their lengths.

Each of the legs 22 and 23 of the yoked member has a hole 41 which extends entirely therethrough and a pin 42 is adapted to be inserted through the hole 41 of each leg and through any one of the holes 40 of the members 38 so that said members 38 can be extended or pushed into the legs to various extents and secured in their adjusted positions.

In Figure 14 instead of the hole and pin connection between the adjusting members, I have illustrated the adjustable terminal members 38ª screw threaded and fitting internal screw threads in the legs of the yoked member so that by screwing the terminal members inward or outward the outer ends thereof can be adjusted at various distances from the ends of the legs of the yoked member. A spring 43, which can be made of a piece of resilient wire, includes a yoked portion 44 having legs 45 spaced apart and these legs have bent portions 46 which are opposed to each other and provide hooked fingers for embracing the respective hooked pulling members 33 at a position below the links as shown in Figures 1 and 2.

In attaching the spring 43, the yoked portion is located between the upper pivotally connected ends of the hooked pulling members and the lower edge surface of the head 27; said yoked portion being included in a plane passing between the links of the pairs 29 and 30 with the leg portions 45 straddling the outer edge surfaces of the upper portions of the hooked pulling members. The resiliency of the spring 43 is such that the spring normally tends to move the hooks 36 of the hooked pulling members apart and it will be noted that if the hooked pulling members are moved toward each other, the spring 43 will be placed under tension and when the hooked pulling members are released the spring will move them apart at their lower ends.

In using the device, for example to remove the ball bearing cup 19, the terminal members 38 are placed against the hub flange 17 at positions diametrically opposite each other with respect to the diameter of the ball bearing cup; the hooked pulling members being compressed or moved toward each other to allow the hooks 36 to be projected through the hole 47 of the ball bearing cup 19. When the hooked pulling members are released, the spring 43 will cause the hooks 36 to move apart with their shoulders 37 in back of the portion 48 of the ball bearing cup immediately adjacent the hole 47 with the outer edge surfaces 49 of the pulling members 33 abutting the inner wall of the hole 47. When the lever 26 is swung on its pivot 25, the head 27 will be moved toward the curved end 24 of the yoked member and the pulling members 33 will be moved lengthwise and the resulting action will be to pull the ball bearing cup out of the hub.

The relative distance between the hooks 36 of the pulling members 33 and the other portions of the device can be changed by moving the terminal members 38 in case the ball bearing cup or its equivalent occupies a different position relatively to the surface against which the terminal members 38 must abut during the withdrawal action. For example the ball bearing cup 20 is located a greater distance from the wheel than is the cup 19 and to accommodate this difference in distance, the terminal pieces are made adjustable so that they can be extended to various extents as believed obvious from the problem above set forth.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A pulling device including means providing leg portions spaced apart; pulling members in line with the space between said leg portions; and a resilient member having a portion engaging each of said pulling members for automatically moving the same apart; and means for moving said pulling members in a direction transversely to the movement imparted by said resilient means; substantially as described.

2. A pulling device including leg portions spaced apart; hooked pulling members; and a resilient member having a portion engaging each of said pulling members for moving the same apart; a lever; and means operatively connecting said pulling members to said lever whereby when the lever is moved, the pulling members will be moved in a direction transversely to the direction imparted by said resilient means; substantially as described.

3. A pulling device including leg portions spaced apart; pulling members having portions pivotally connected together; operating means mounted on said leg portions; and links pivotally connecting said operating means with said pulling members; substantially as described.

4. A pulling device including leg portions spaced apart; pulling members having portions pivotally connected together; operating means mounted on said leg portions; a head pivotally connected to said operating means; and links pivotally connecting said head with said pulling members; substantially as described.

5. A pulling device including leg portions spaced apart; pulling members having portions pivotally connected together; operating means mounted on said leg portions; a head pivotally connected to said operating means; links pivotally connecting said head with said pulling members; and resilient means for moving said members on their connected portions as a pivot; substantially as described.

6. A pulling device including leg portions spaced apart; pulling members having portions pivotally connected together; operating means mounted on said leg portions; links pivotally connecting said operating means with said pulling members; and a resilient member disposed within said links and having a portion connected to each of said pulling members; substantially as described.

7. A pulling device including leg portions spaced apart; adjustable extensions on said leg portions; pulling members having portions pivotally connected together; a lever mounted on said leg portions; a head pivotally connected to said lever; links pivotally connecting said head with said pulling members; and a resilient member disposed within said links and having a portion connected to each of said pulling members; substantially as described.

In testimony whereof I have signed my name to this specification in the presence of two subscribing witnesses.

CLAUDE H. ALEXANDER.

Witnesses:
ELIZABETH GARBE,
CHAS. E. POTTS.